United States Patent [19]
Enomoto et al.

[11] Patent Number: 5,330,168
[45] Date of Patent: Jul. 19, 1994

[54] DEVICE FOR CLAMPING A WORKPIECE

[75] Inventors: Minoru Enomoto, Obu; Shoji Inagaki, Anjo; Yasuhiro Okada, Nagoya; Fumio Sakamoto; Noritaka Ise, both of Toyota; Masashi Ito, Seto; Fuyuhiko Yoshikura, Nagoya, all of Japan

[73] Assignee: Toyoda Koki Kabushiki Kaisha, Kariya, Japan

[21] Appl. No.: 9,074

[22] Filed: Jan. 26, 1993

[30] Foreign Application Priority Data

Jan. 30, 1992 [JP] Japan .................................. 4-015331

[51] Int. Cl.⁵ .............................................. B25B 1/10
[52] U.S. Cl. ................................................ 269/329
[58] Field of Search ....................... 269/24, 27, 28, 23, 269/329, 240, 242, 244, 246; 73/862.31, 862.49, 862.65

[56] References Cited

U.S. PATENT DOCUMENTS 4,738,438 4/1988 Horie et al. .
5,139,246 8/1992 Yakou .................................. 269/329

FOREIGN PATENT DOCUMENTS 0294547 12/1988 European Pat. Off. .
2423862 11/1975 Fed. Rep. of Germany .
3023413 1/1982 Fed. Rep. of Germany .
63-84833 4/1988 Japan .

OTHER PUBLICATIONS

Patent Abstracts of Japan, vol. 12, No. 311, (m-734), Aug. 24, 1988, JP-A-63 084 833, Apr. 15, 1988.
Patent Abstracts of Japan, vol. 16, No. 132, (M-1229), Apr. 3, 1992, JP-A-32 93 300, Dec. 24, 1991.

Primary Examiner—Robert C. Watson
Attorney, Agent, or Firm—Oblon, Spivak, McClelland, Maier & Neustadt

[57] ABSTRACT

A clamping device which holds a workpiece at a predetermined position during a machining operation of the workpiece comprises a clamper for clamping a workpiece, a feed device for moving the clamper in the axial direction, a load sensor which is fixed to the clamper and detects a clamping force acting on the workpiece, and a memory in which a target clamping force corresponding to the shape of the workpiece and a method of machining operation is stored. The control device compares the clamping force detected by the load sensor with the target clamping force stored in the memory and controls the clamper in response to the deviation between the detected clamping force and the target clamping force. The clamping device also has a position detecting means for detecting the axial position of the clamper. The control device compares the present position detected by the position detecting means with a stop position which is detected during the initial clamping and is stored in the memory, and controls the clamper in proportion to the deviation between the detected position and the stored stop position.

10 Claims, 9 Drawing Sheets

DEVICE FOR CLAMPING A WORKPIECE

BACKGROUND OF THE INVENTION

1. Field of the Invention

The present invention relates to a clamping device for holding a workpiece at a predetermined position during a machining operation of the workpiece.

2. Discussion of the Prior Art

Holding a workpiece at a predetermined position with a predetermined clamping force is important for raising machining accuracy of the workpiece. Many kinds of clamping devices are used according to shapes of workpieces and machining methods. A clamping device generally used has a hydraulic cylinder by which a clamper is moved so as to hold the workpiece at a predetermined position. Since the pressure of oil used for moving the clamper is set to a constant level, it is impossible to select a suitable clamping force according to the shape of a workpiece and the machining method, thereby the machining accuracy of the workpiece tends to decrease. Further, in the event that many kinds of workpieces are machined, it is difficult to properly hold all kinds of the workpieces because each kind of workpiece requires a different clamping force.

To solve the above-mentioned problems, a clamping device having accumulators and a switching valve has been proposed as is disclosed in Japanese Laid-Open Patent Publication No. 63-84833. Oils having different pressures are filled in the respective accumulators. When an operator or a command from a numerical controller operates the switching valve, oil from a selected accumulator is supplied to the cylinder for advancing the clamper. Therefore, the clamping force of the clamper can be changed according to the shape of a workpiece and the machining method.

However, even in the above-described construction, the clamping force of the clamper is merely changed to one of two different clamping forces. It is therefore difficult to hold the workpiece with a suitable clamping force. Further, there is a problem that a plurality of accumulators, pipes and the switching valve require a large space. Furthermore, the use of oil needs a pump which would generate noises and heat.

SUMMARY OF THE INVENTION

Accordingly, it is an object of the present invention to provide an improved clamping device which can hold a workpiece with a suitable clamping force.

Another object of the present invention is to provide a clamping device which can properly hold a workpiece by monitoring the positional change of a clamper as well as the clamping force produced by the clamper.

Briefly, the present invention provides a clamping device which holds a workpiece at a predetermined position during a machining operation of the workpiece. The clamping device comprises a housing, a clamper carried by the housing to be movable for clamping the workpiece, a feed device for moving the clamper toward the workpiece, a load sensor means for detecting a clamping force generated by the clamper, a memory means in which a target clamping force is stored, and a control means. The control means compares the clamping force detected by the load sensor means with the target clamping force stored in the memory means. The feed device is controlled by the control means in response to the deviation between the detected clamping force and the target clamping force so that the workpiece is held with the target clamping force.

With this configuration, the clamping force detected by the load sensor means is compared with the target clamping force preset in a memory and a deviation therebetween is obtained. The feed device is operated in response to the deviation. Thus, the clamper is able to clamp the workpiece with a suitable clamping force corresponding to the shape of the workpiece and the machining method. As a result, the machining accuracy of the workpiece can be increased.

In the another embodiment of the present invention, the clamping device also has position detecting means for detecting the axial position of the clamper. In addition to the clamping force, the axial position detected by the position detecting means is also used to be compared with the initial stop position of the clamper stored in the memory. The feed device is also operated in response to the deviation between the present position and the initial stop position.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

The preferred embodiment of the present invention will now be described with reference to drawings.

Figure 1:
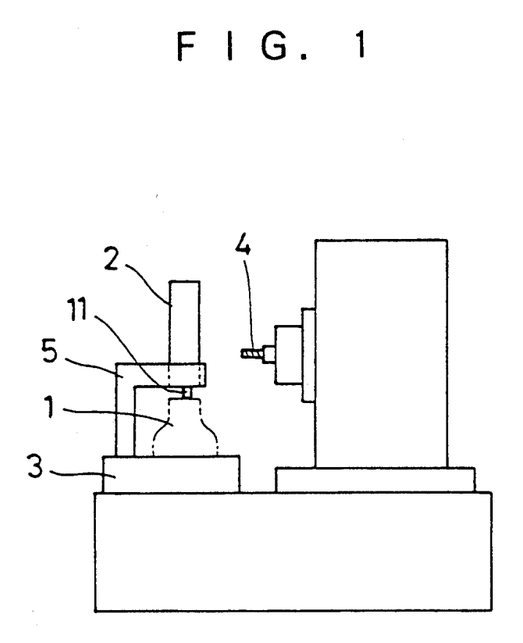
FIG. 1 is a an overall view illustrating an apparatus for machining a workpiece in which a clamping device according to the present invention is employed.

Referring to FIG. 1, numeral 1 designates a workpiece which is machined by a tool 4 such as a cutting tool. The workpiece 1 is held on a machining table 3 at a predetermined position with a clamping force of a clamper 11. A clamping device 2 which has the clamper 11 is supported by a support member 5 fixed on the machining table 3.

Figure 2:
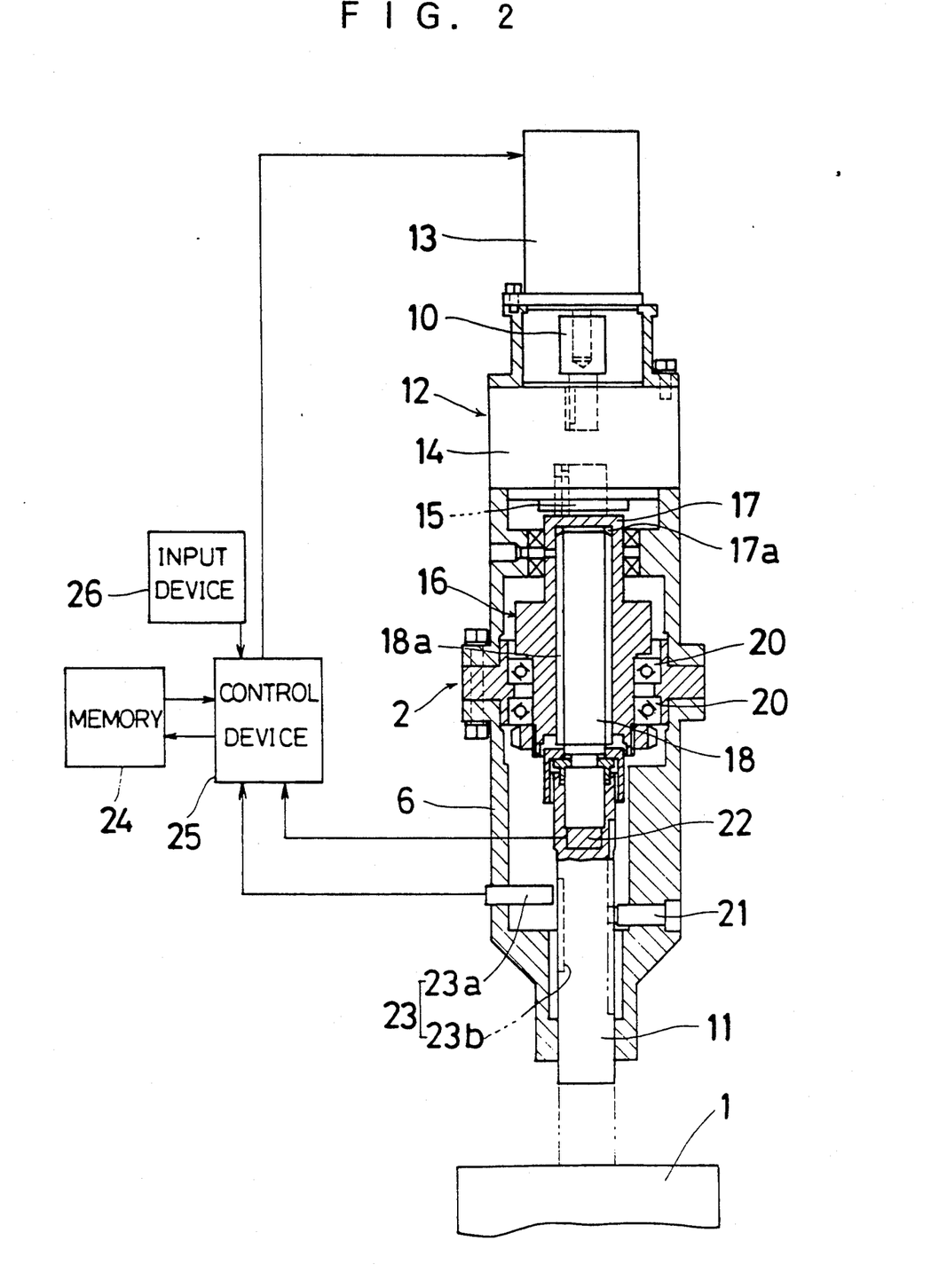
FIG. 2 is a sectional view of the clamping device according to the present invention.

The construction of the clamping device 2 is illustrated in FIG. 2. In a housing 6, the clamper 11 is supported movably in the direction of clamping the workpiece 1. A feed device 12 which moves the clamper 11 is mainly composed of a servomotor 13, a reduction gear 14 and a kinetic converter 16. An intermediate shaft 10 is disposed between an output shaft of the servomotor 13 and the reduction gear 14, whereby the rotation of the output shaft of the servomotor 13 is transmitted to the reduction gear 14.

The kinetic converter 16 is composed of a rotational member 17 and a reciprocation shaft 18. The rotational member 17 has a cylindrical shape and is connected with an output rotary member 15 of the reduction gear 14. An internal thread 17a is formed on an inner cylindrical surface of the rotational member 17. The outer cylindrical surface of the rotational member 17 is rotatably supported by the housing 6 through bearings 20 so that the rotational member 17 rotates in response to the rotation of the output rotary shaft 15. On the other hand, an external thread 18a engaged with the internal thread 17a is formed on the outer cylindrical surface of the reciprocation shaft 18. The forward end of the reciprocation shaft 18 is coupled with the clamper 11. The clamper 11 is provided with a groove extending in the axial direction with which an engagement member 21 is engaged for allowing the clamper 11 to move only in the axial direction. The rotation of the output rotary member 15 is converted into the axial movement of the reciprocation shaft 18 by the kinetic converter 16 in which the internal thread 17a of the rotational member 17 is engaged with the external thread 18a of the reciprocation shaft 18. Trapezoidal threads can be used as the internal thread 17a and external thread 18a.

The clamper 11 coupled to the reciprocation shaft 18 is provided with a load sensor 22. When the clamper 11 contacts the workpiece 1 to clamp the workpiece 1, the load sensor 22 detects the clamping force. Further, the clamper 11 is provided with a linear magnetic scale 23b extending in the axial direction. In the housing 6, a detection head 23a is disposed so as to face the linear magnetic scale 23b and to be magnetically coupled therewith. The detection head 23a and the linear magnetic scale 23b constitute a position detecting means 23 for detecting the axial position of the clamper 11. An encoder for detecting the rotation of the output shaft of the servomotor 13 may be substituted for the position detecting means 23.

The clamping force signal output from the load sensor 22 and the position signal output from the position detecting means 23 are input to a control device 25 which is composed of a CPU and interfaces. In a memory 24 connected to the control device 25, there are stored data of target clamping forces. Namely, the data of the target clamping forces corresponding to the shapes of workpieces and machining methods are stored in the memory 24 in advance. One of the target clamping forces is selected by the use of an input device 26. In the memory 24, there is also stored a program for executing the clamping operation in four different control modes. An operator can select one of the four control modes, and the number of the selected control mode is stored in the memory 24.

The operation of the clamping device 2 according to the present invention is as follows.

When the operator selects a target clamping force and a control mode corresponding to the shape of a workpiece to be clamped and the machining method using the input device 26, the data of the target clamping force and the control mode are fetched from the memory 24 by the control device 25. In response to the data, the control device 25 controls the rotation of the servomotor 13. The rotation of the servomotor 13 is transmitted to the output rotary member 15 through the reduction gear 14. The rotation of the output rotary member 15 is then converted into the axial movement of the reciprocation shaft 18 by the kinetic converter 16. Thus, the clamper 11 coupled to the reciprocation shaft 18 clamps the workpiece 1.

During the machining operation, the clamping force and the position are detected by the load sensor 22 and the position detecting means 23, respectively, and are fed to the control device 25. In response to the detected clamping force and position, the control device 25 controls the servomotor 13.

There are four modes by which the control device 25 controls the movement of the clamper 11, as shown in FIG. 4 to FIG. 7(b).

Figure 3:
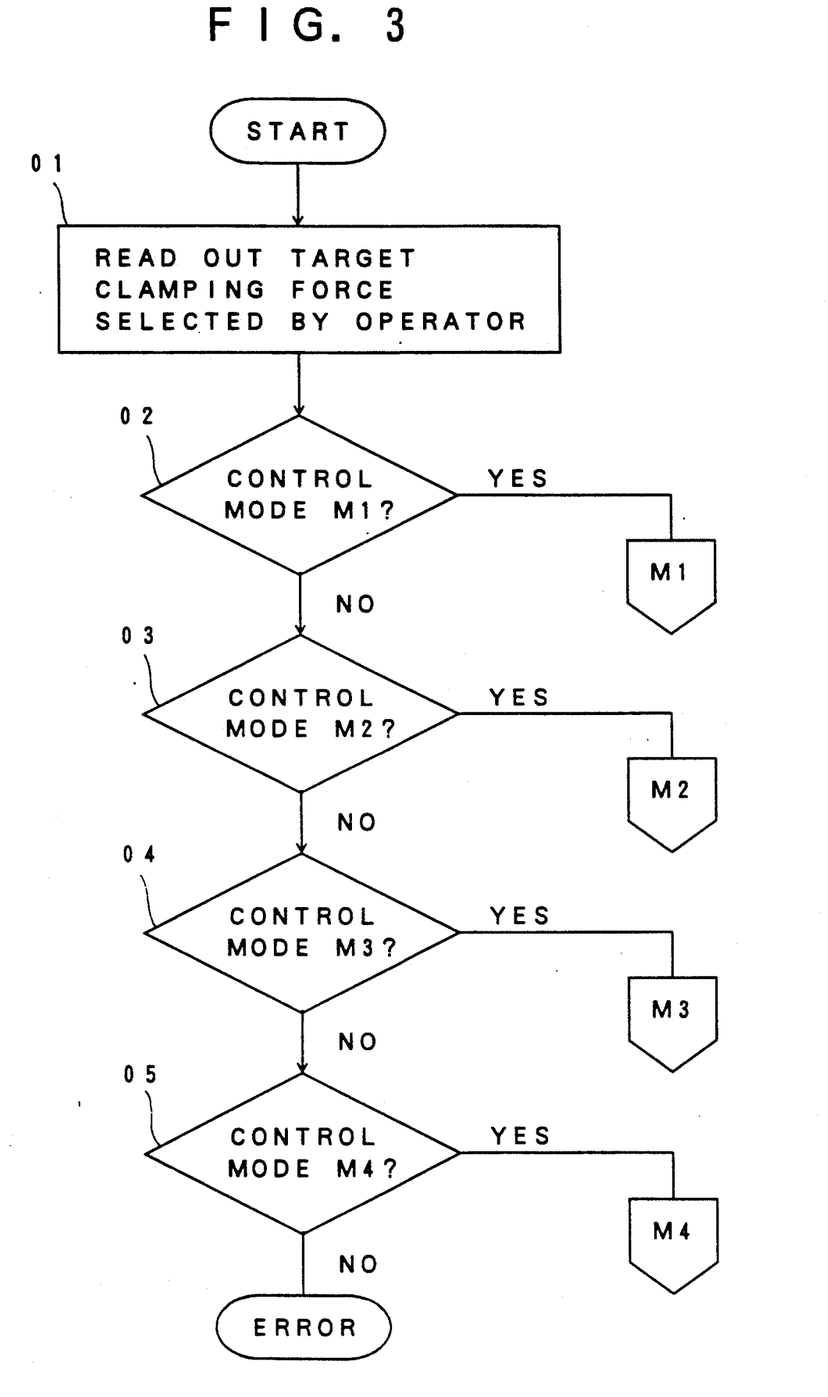
FIG. 3, 4, 5, 6(a), 6(b), 7(a), and 7(b) are flowcharts showing the operations of a control device according to the present invention.

Referring to FIG. 3, at step 01, data about a target clamping force and control mode which are selected by the operator are read out from the memory 24. At steps 02 to 05, the control device 25 judges which control mode is selected by the operator. If no mode M1 to M4 is selected, an appropriate process for error is executed.

Control Mode M1

Figure 4:
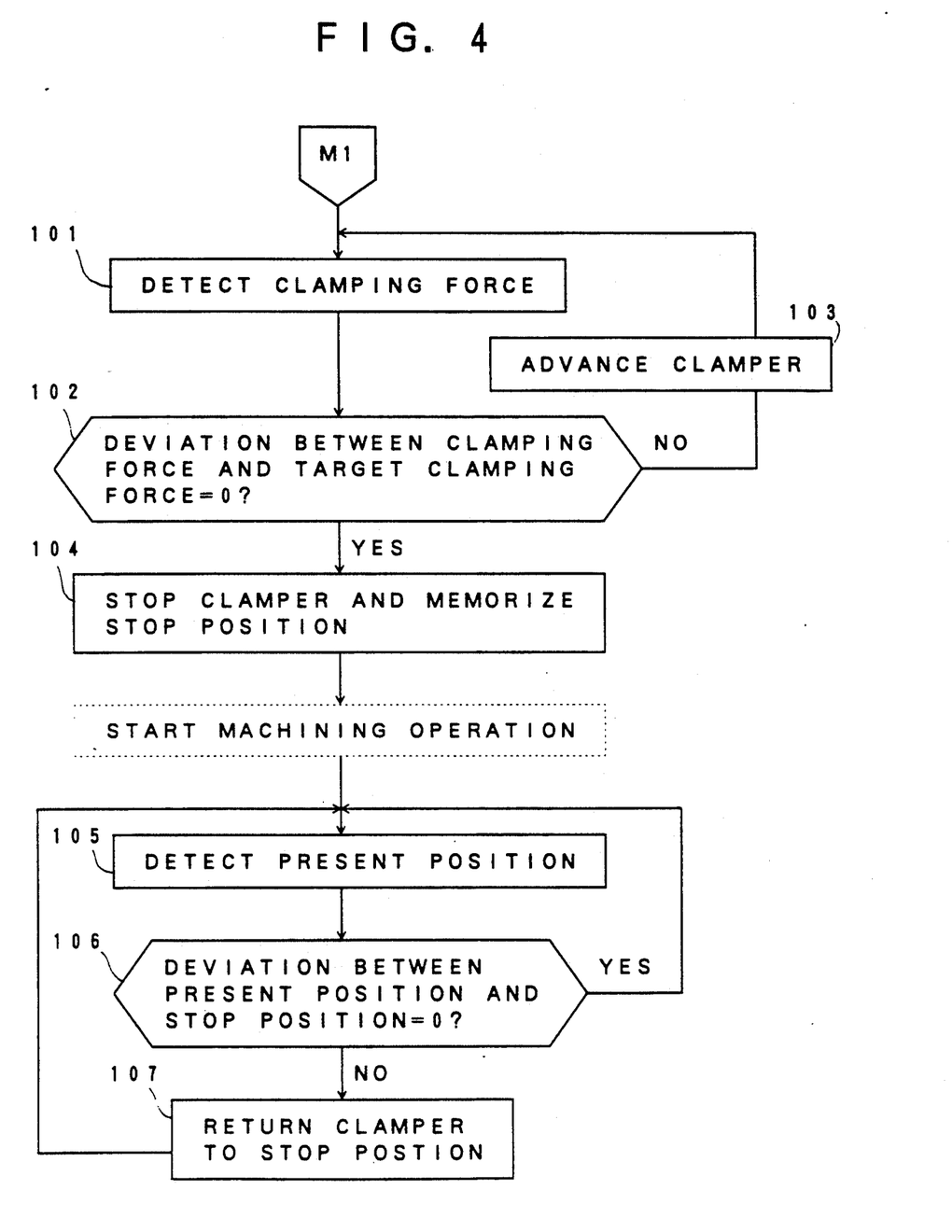

The first control mode M1 is illustrated in FIG. 4. When the control mode M1 is selected, the process proceeds to step 101 at which the clamping force detected by the load sensor 22 is input to the control device 25. At step 102, the clamping force thus detected is compared with the target clamping force. If it is judged that the deviation therebetween is not zero, the process proceeds to step 103 at which the servomotor 13 is rotated in a forward direction by a predetermined amount so as to advance the clamper 11 toward the workpiece 1. The clamping force is then detected at step 101 again. If it is judged at step 102 that the deviation is zero, namely the clamping force is equal to the target clamping force, the process proceeds to step 104. At step 104, the clamper 11 is stopped. The stop position detected by the position detecting means 23 is input and is stored in the memory 24.

When the machining operation is started, the process proceeds to step 105 at which present position is detected by the position detecting means 23°. At next step 106, the present position is compared with the stop position detected at step 104. If it is judged that the deviation between the positions is not zero, the servomotor 13 is rotated in such a direction at step 107 that the clamper 11 is returned to the stop position. Thereafter, the process returns to step 105 and the present position is detected again. If it is judged at step 106 that the deviation between the positions is zero, the process returns to step 105. Namely, the present position of the clamper 11 is repeatedly compared with the stop position and the clamper 11 is return to the stop position. Accordingly, the clamper 11 is always controlled to stay at the stop position by so-called servo-lock operation. This control mode M1 is used in cases where it is required to prevent the workpiece from moving in a backward direction from the initial stop position during the machining operation.

Control Mode M2

Figure 5:
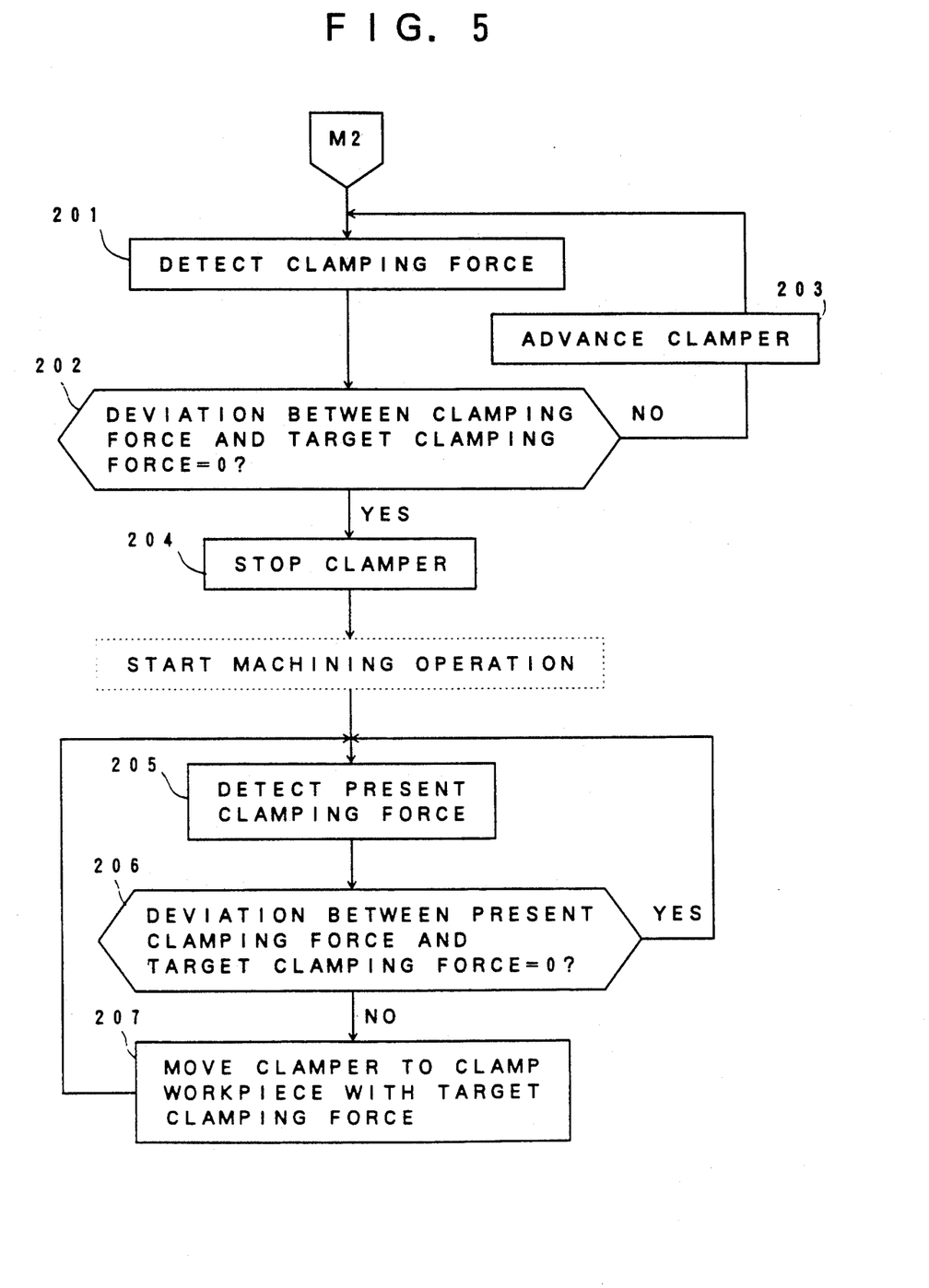

When the control mode M2 is selected, the process proceeds to step 201 of FIG. 5. In FIG. 5, control at steps 201 to 203 is the same as that at steps 101 to 103 shown in FIG. 4. When it is judged at step 202 that the deviation between the detected clamping force and the target clamping force is zero, namely the clamping force is equal to the target clamping force, the process proceeds to step 204 at which the clamper 11 is stopped.

When the machining operation is started, the process proceeds to step 205 at which a present clamping force is detected. At next step 206, the present clamping force is compared with the target clamping force. If it is judged that the deviation therebetween is not zero, the process proceeds to step 207. At step 207, the servomotor 13 is rotated so that the clamper 11 clamps the workpiece 1 with the target clamping force. Thereafter, the process returns to step 205 and the present clamping force is detected again. If it is judged at step 206 that the deviation between the clamping forces is zero, the process returns to step 205. Accordingly, the present clamping force of the clamper 11 is repeatedly compared with the target clamping force and the clamper 11 is always controlled to clamp the workpiece 1 with the target clamping force. This control mode M2 is used in cases where it is required to clamp the workpiece with a predetermined clamping force regardless of the positional change of a clamp surface of the workpiece.

Control Mode M3

Figure 6:
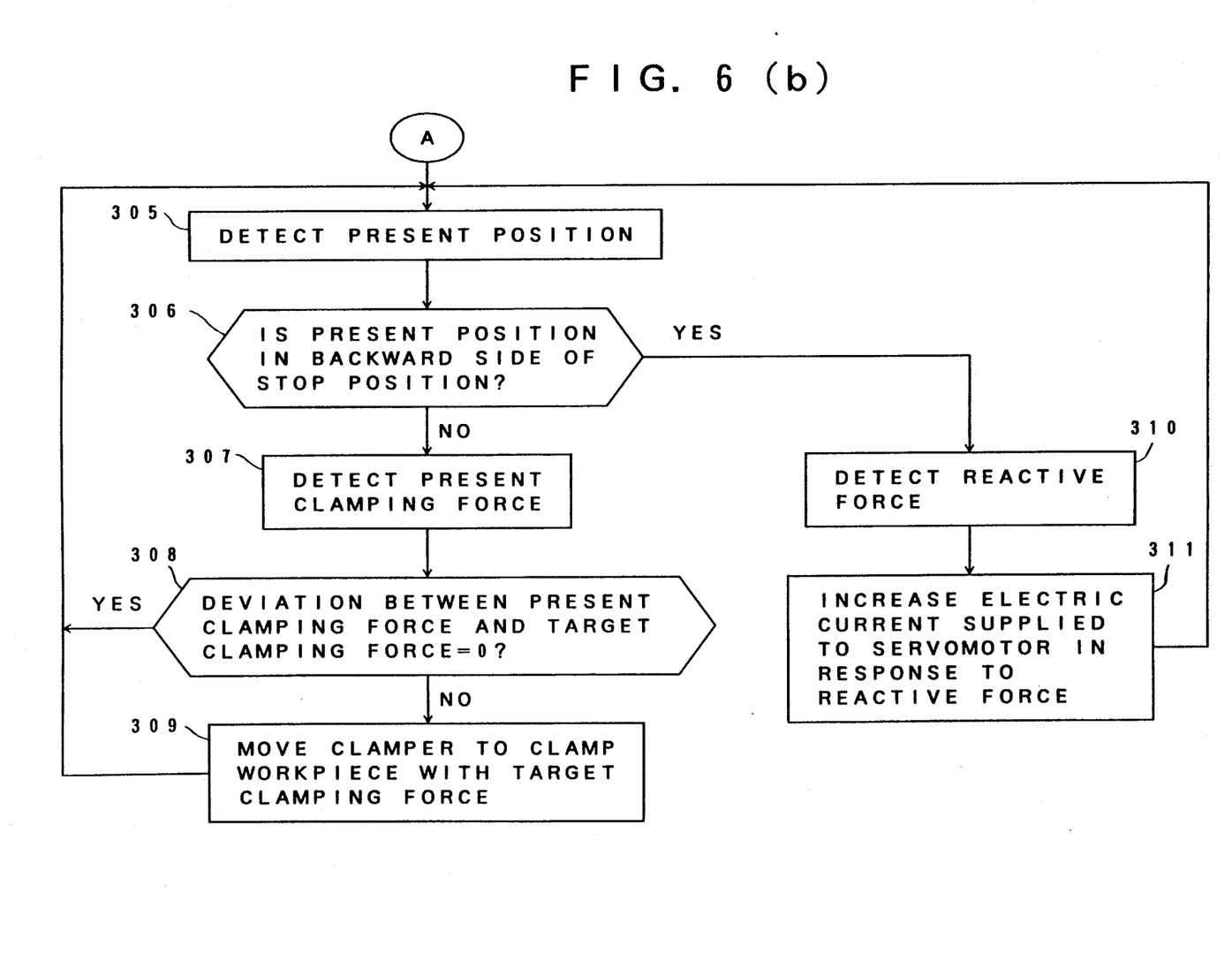
Figure 6A:
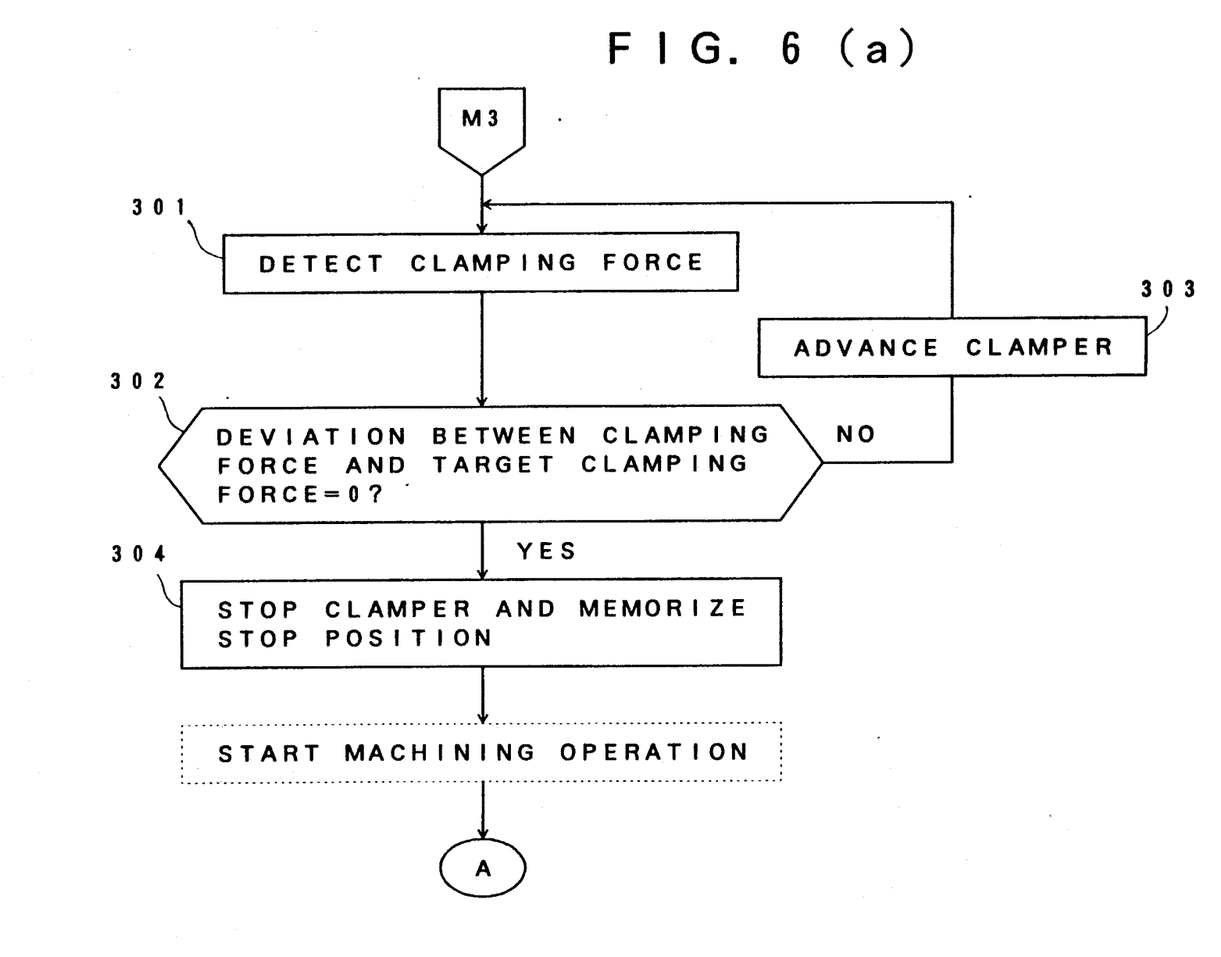

Control Mode M3 is illustrated in FIGS. 6(a) and (b). When the control mode M3 is selected, the process proceeds to step 301. Control at steps 301 to 305 is the same as that at steps 101 to 105 of the control Mode M1.

At step 306, it is judged whether or not the present position is in the backward side with respect to the stop position. If the present position is not in the backward side, the process proceeds to step 307 at which a present clamping force is detected. At next step 308, the present clamping force is compared with the target clamping force. If it is judged that the deviation therebetween is not zero, the process proceeds to step 309. At step 309, the servomotor 13 is rotated so that the clamper 11 clamps the workpiece 1 with the target clamping force. Thereafter, the process returns to step 305. If it is judged at step 308 that the deviation between the clamping forces is zero, the process returns directly to step 305.

If the present position is in the backward side with respect to the stop position, reactive force is detected using the load sensor 22 at step 310. Namely, the reactive force is detected based upon the amount of increase of the detected clamping force. At step 311, the electric current is increased to the servomotor 13 by increasing the voltage supplied thereto so that the clamping force of the clamper 11 increases in proportion to the reactive force. Thereafter, the process returns to step 305 and the present position is detected again.

As described above, when the present position is not in the backward side with respect to the stop position, the process proceeds to steps 307 to 309 which are same control as steps 205 to 207 of Control Mode M2, respectively. Namely, the clamper 11 is controlled to clamp the workpiece 1 with the target clamping force. On the other hand, when the position is in the backward side, the clamper 11 is controlled in response to the reactive force acting on the workpiece 1. This control mode M3 is used in cases where it is required to increase the clamping force when the workpiece starts moving the clamper in the backward direction.

Control Mode M4

Figure 7A:
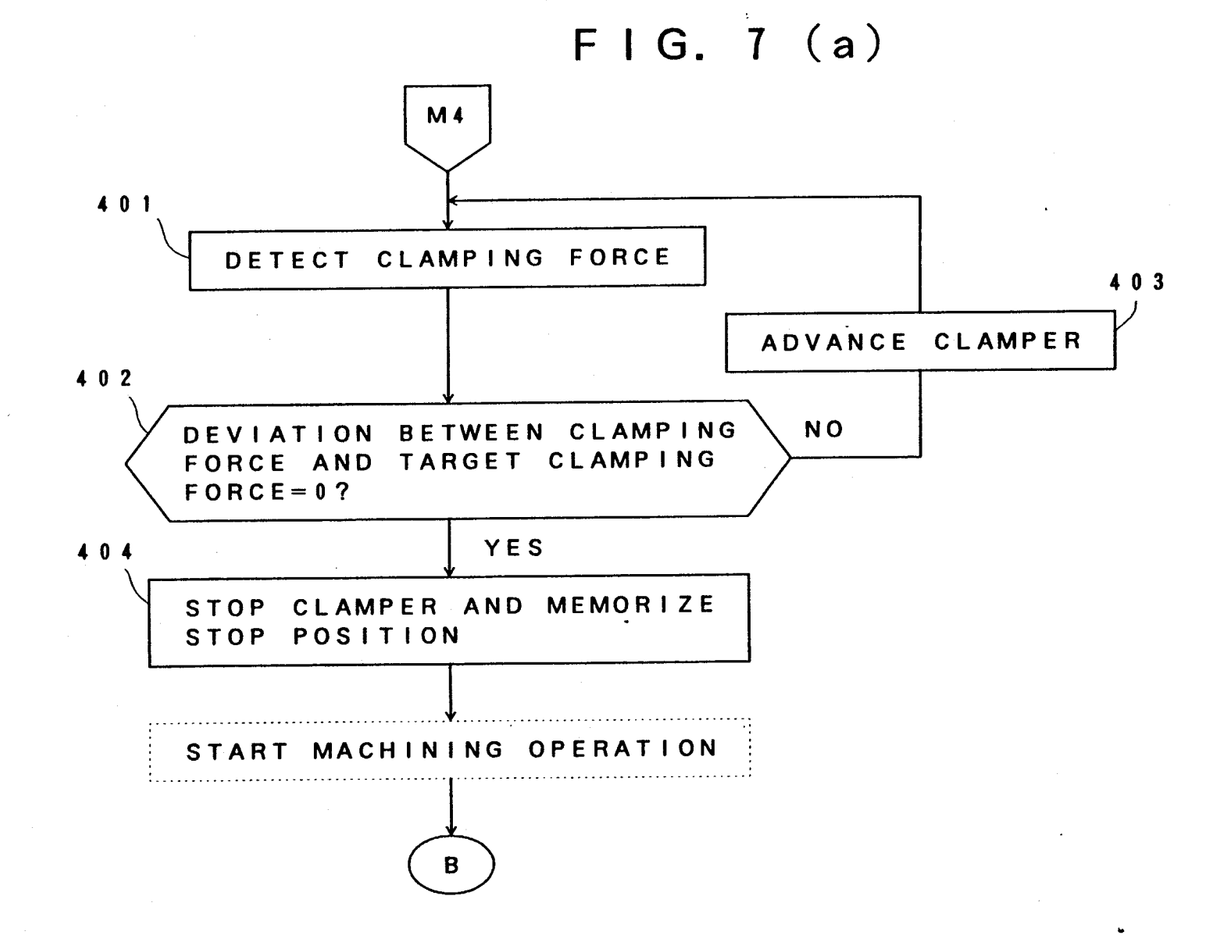

Control Mode M4 is illustrated in FIGS. 7(a) and (b). When the control mode M4 is selected, the process proceeds to step 401. Control at steps 401 to 409 is the same as that of steps 301 to 309 of the Control Mode M3 shown in FIGS. 6(a) and (b). The characteristic of the Control Mode M4 is as follows.

Figure 7B:
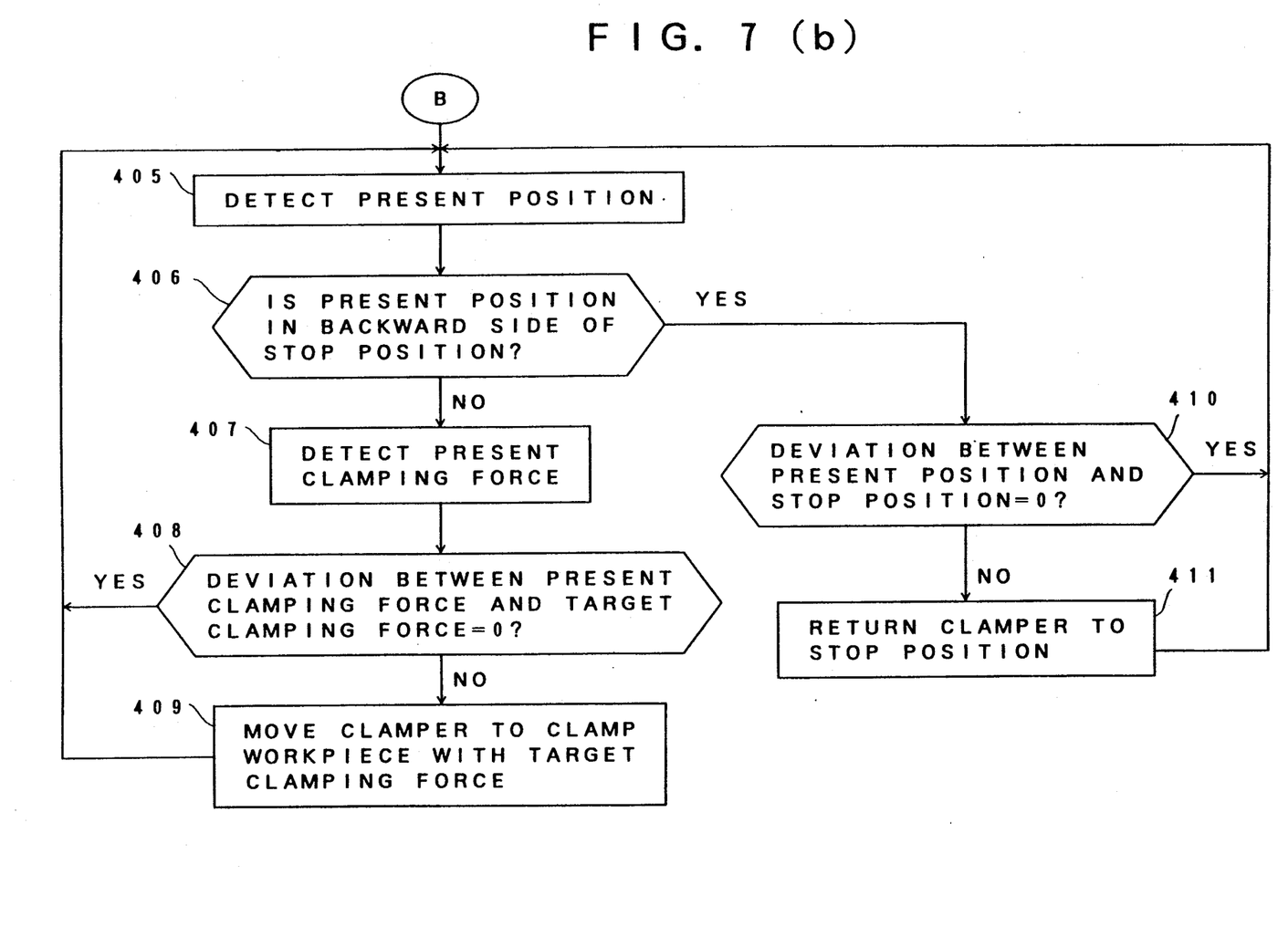

If it is judged at step 406 that the present position is in the backward side with respect to the stop position, the process proceeds to step 410. At step 410, the present position is compared with the stop position detected at step 404. If it is judged that the deviation between the positions is not zero, the servomotor 13 is driven to rotate in such a direction at step 411 that the clamper 11 is returned to the stop position. Thereafter, the process returns to step 405 and the present position is detected again. If it is judged at step 410 that the deviation between the positions is zero, the process returns to step 405. This control mode M4 is used in cases where it is required to prevent the workpiece from moving backward from the initial stop position and is required to move the clamper to keep the initial clamping force when the position of the clamp surface of the workpiece moves forward in the clamping direction.

As described above, since a suitable clamping force can be set according to the shape of a workpiece to be clamped and the machining method, the workpiece can be clamped properly. Further, since the operator changes the clamping force by merely selecting one of target clamping forces, the target clamping force can be changed easily. Accordingly, it is possible to machine many kinds of workpieces speedily and precisely.

Incidentally, the servomotor 13 which drives the feed device 12 does not require a large space compared to the hydraulic cylinder. The servomotor 13 also generates little noise and heat.

Although in the above-described embodiment, the clamper 11 and the feed device 12 which moves the clamper 11 are both assembled in the housing 6, the feed device 12 may be placed remote from the clamper 11. In such case, both of them are fluidically connected to each other through an oil pipe. The reciprocation movement produced by the feed device 12 is transmitted to the clamper 11 through the oil pipe filled with oil. With this arrangement, it is possible to remotely control the clamper 11.

Obviously, numerous modifications and variations of the present invention are possible in light of the above teachings. It is therefore to be understood that within the scope of the appended claims, the present invention may be practiced otherwise than as specifically described herein.

We claim:

1. A clamping device in a machine tool, said clamping device holding a workpiece at a predetermined position during a machining operation of the workpiece by the machine tool and comprising:
   a housing;
   a clamper carried by said housing to be movable for clamping said workpiece;
   a feed device for moving said clamper toward said workpiece;
   a load sensor means for detecting a clamping force generated by said clamper;
   a memory means in which a target clamping force is stored; and
   a control means for comparing the clamping force detected by said load sensor means with the target clamping force stored in said memory means, and for controlling said feed device during the machining operation in response to a deviation between the detected clamping force and the target clamping force so that said workpiece is held with the target clamping force during the machining operation.

2. A clamping device as set forth in claim 1, wherein:
   said clamper is carried by said housing for axial movement; and
   said feed device comprises a servomotor having a rotating output shaft and a kinetic converter for converting the rotational movement into axial movement.

3. A clamping device as set forth in claim 2, wherein:

said kinetic converter is composed of a rotational member having an internal thread and a reciprocation shaft having an external thread engaged with said internal thread, the reciprocation shaft being coupled with said clamper.

4. A clamping device in a machine tool, said clamping device holding a workpiece at a predetermined position during a machining operation of the workpiece by the machine tool and comprising:

a housing;

a clamper carried by said housing to be movable for clamping said workpiece;

a feed device for moving said clamper toward said workpiece;

a load sensor means for detecting a clamping force generated by said clamper;

a position detecting means for detecting an axial position of said clamper;

a memory means in which a target clamping force is stored;

a first control means for actuating said feed device until the clamping force detected by said load sensor means reaches the target clamping force stored in said memory means in preparation for a machining operation;

a second control means for inputting a signal output from said position detecting means when said clamper is stopped after the movement by said first control means so as to detect an initial stop position; and a third control means for actuating said feed device when the position detected by said position detecting means deviates from the initial stop position during the machining operation, whereby said clamper is prevented from moving from the initial stop position after clamping.

5. A clamping device as set forth in claim 4, wherein:

said position detecting means comprises a linear magnetic scale affixed to said clamper and a detection head magnetically coupled with said linear magnetic scale.

6. A clamping device as set forth in claim 4, wherein:

said feed device comprises a servomotor having a rotatable output shaft, and said position detecting means comprises an encoder for detecting the rotation of the servomotor.

7. A clamping device in a machine tool, said clamping device holding a workpiece at a predetermined position during a machining operation of the workpiece by the machine tool and comprising:

a housing;

a clamper carried by said housing to be movable for clamping said workpiece;

a feed device for moving said clamper toward said workpiece;

a load sensor means for detecting a clamping force generated by said clamper;

a position detecting means for detecting an axial position of said clamper;

a memory means in which a target clamping force is stored;

a first control means for actuating said feed device until the clamping force detected by said load sensor means reaches the target clamping force stored in said memory means in preparation for a machining operation;

a second control means for inputting a signal output from said position detecting means when said clamper is stopped after the movement by said first control means so as to detect an initial stop position;

a third control means for increasing a clamping force applied by said feed device when a position detected by said position detecting means is in a backward side of said stop position during the machining operation; and a fourth control means for comparing the clamping force detected by said load sensor means during the machining operation with the target clamping force, and for controlling said feed device in response to a deviation between the detected clamping force and the target clamping force so that the workpiece is held with the target clamping force during the machining operation and when the position detected by said position detecting means is not in a backward side of said stop position.

8. A clamping device as set forth in claim 7 including means for detecting a reactive force on said clamper, wherein said third control means increases the clamping force in proportion to the reactive force.

9. A clamping device in a machine tool, said clamping device holding a workpiece at a predetermined position during a machining operation of the workpiece by the machine tool and comprising:

a housing;

a clamper carried by said housing to be movable for clamping said workpiece;

a feed device for moving said clamper toward said workpiece;

a load sensor means for detecting a clamping force generated by said clamper;

a position detecting means for detecting an axial position of said clamper;

a memory means in which a target clamping force is stored;

a first control means for actuating said feed device until the clamping force detected by said load sensor means reaches the target clamping force stored in said memory means in preparation for a machining operation;

a second control means for inputting a signal output from said position detecting means when said clamper is stopped after the movement by said first control means so as to detect an initial stop position;

a third control means for activating said feed device to return said clamper to the stop position when a position detected by said position detecting means is in a backward side of said stop position during the machining operation; and a fourth control means for comparing the clamping force detected by said load sensor means during the machining operation with the target clamping force, and for controlling said feed device so that the workpiece is held with the target clamping force during the machining operation and when the position detected by said position detecting means is not in a backward side of said stop position during the machining operation.

10. A clamping device in a machine tool, said clamping device holding a workpiece at a predetermined position during a machining operation of the workpiece by the machine tool and comprising:

a housing;

a clamper carried by said housing to be movable for clamping said workpiece;

a feed device for moving said clamper toward said workpiece;

a position detecting means for detecting an axial position of said clamper;

a first control means for moving said clamper until said workpiece is held with a predetermined clamping force, before the machining operation;

a second control means for inputting a stop position where said clamper is stopped after the movement by said first control means;

a third control means operable when the position detected by said position detecting means deviates from said stop position during the machining operation, for actuating said feed device depending on such deviation.

* * * * *